US010831335B2

(12) United States Patent
Rosas et al.

(10) Patent No.: US 10,831,335 B2
(45) Date of Patent: Nov. 10, 2020

(54) CYLINDRICAL INTERFACE FOR AUGMENTED REALITY/VIRTUAL REALITY DEVICES

(71) Applicant: Disney Enterprises, Inc., Burbank, CA (US)

(72) Inventors: Wilfredo Rosas, Encino, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/527,388

(22) Filed: Jul. 31, 2019

(65) Prior Publication Data

US 2019/0354260 A1     Nov. 21, 2019

Related U.S. Application Data

(63) Continuation of application No. 15/807,303, filed on Nov. 8, 2017, now Pat. No. 10,430,019.

(51) Int. Cl.
| | | |
|---|---|---|
| *G06T 15/00* | (2011.01) | |
| *G06F 3/0481* | (2013.01) | |
| *G06T 19/00* | (2011.01) | |
| *G06F 3/0482* | (2013.01) | |
| *G06F 3/01* | (2006.01) | |
| *G06T 15/20* | (2011.01) | |

(52) U.S. Cl.
CPC ......... *G06F 3/04815* (2013.01); *G06F 3/011* (2013.01); *G06F 3/013* (2013.01); *G06F 3/017* (2013.01); *G06F 3/0482* (2013.01); *G06T 19/006* (2013.01); *G06T 15/20* (2013.01)

(58) Field of Classification Search
CPC . G06T 17/05; G06T 2210/61; G06T 2200/08; G06T 3/4007; H04N 7/18; H04N 7/183; G01S 13/89; G01S 17/023; G01S 17/936; G01S 7/295; G01S 13/86; G01S 13/865; G01S 13/867; G01S 13/931; G01S 2013/9367; G01S 2013/9375; G01S 2013/9385; G01S 2013/9392; G01S 17/89; G06K 9/00805
USPC ....................................................... 345/418
See application file for complete search history.

(56) References Cited

U.S. PATENT DOCUMENTS 10,430,019 B2 * 10/2019 Rosas .................. G06F 3/0482

OTHER PUBLICATIONS

Carne, 6 ways to use BLE beacons for people and asset tracking, Jul. 12, 2017.*

* cited by examiner

*Primary Examiner* — Phu K Nguyen
(74) *Attorney, Agent, or Firm* — Patterson + Sheridan, LLP

(57) ABSTRACT

Embodiments are described to perform an operation comprising determining a position of an augmented reality and/or virtual reality (AR/VR)-capable device relative to a position of a tracking point, determining a first arrangement of a first plurality of graphical user interface (GUI) elements associated with an application based on the position of the AR-capable device relative to the tracking point, and generating, by operation of a processor, a GUI comprising the first plurality of GUI elements arranged according to the first arrangement within a volume of a cylinder.

20 Claims, 14 Drawing Sheets

CYLINDRICAL INTERFACE FOR AUGMENTED REALITY/VIRTUAL REALITY DEVICES

CROSS-REFERENCE TO RELATED APPLICATIONS

This application is a continuation of co-pending U.S. patent application Ser. No. 15/807,303, filed Nov. 8, 2017. The aforementioned related patent application is herein incorporated by reference in its entirety.

BACKGROUND

The present disclosure generally relates to augmented reality (AR) and/or virtual reality (VR) devices. More specifically, the present disclosure relates to a cylindrical graphical user interfaces for AR and/or VR devices.

Computer graphics technology has significantly progressed to include three-dimensional (3D) graphics engines which provide photo-realistic interactive game play support AR and/or VR content. However, conventional two-dimensional (2D) graphical user interfaces have been used in these modern 3D environments. In such 2D interfaces, all elements are outputted in a single plane, and the user moves a cursor to a desired item for selection. However, such 2D graphical user interfaces fail to unlock the full range of information and user experiences available in 3D environments.

SUMMARY

According to a first embodiment of the present disclosure, a method is provided. The method comprises determining a position of an augmented reality and/or virtual reality (AR/VR)-capable device relative to a position of a tracking point, wherein the tracking point comprises a physical beacon device, determining a first arrangement of a first plurality of graphical user interface (GUI) elements associated with an application based on the position of the AR/VR-capable device relative to the tracking point, and generating, by operation of a processor, a GUI comprising the first plurality of GUI elements arranged within a volume of a cylinder according to the first arrangement, wherein the cylinder is centered on the tracking point.

According to a second embodiment of the present disclosure, an augmented reality and/or virtual reality (AR/VR)-capable device is provided. The AR/VR capable device includes a processor and a memory containing a program which, when executed by the processor, performs an operation. The operation comprises determining a position of the AR/VR-capable device relative to a position of a tracking point, wherein the tracking point comprises a physical beacon device, determining a first arrangement of a first plurality of graphical user interface (GUI) elements associated with an application based on the position of the AR/VR-capable device relative to the tracking point, and generating, by operation of the processor, a GUI comprising the first plurality of GUI elements arranged within a volume of a cylinder according to the first arrangement, wherein the cylinder is centered on the tracking point.

According to a third embodiment of the present disclosure, a non-transitory computer-readable storage medium is provided. The non-transitory computer-readable storage medium has computer-readable program code embodied therewith, the computer-readable program code executable by a processor to perform an operation. The operation comprises determining a position of an augmented reality and/or virtual reality (AR/VR)-capable device relative to a position of a tracking point, wherein the tracking point comprises a physical beacon device, determining a first arrangement of a first plurality of graphical user interface (GUI) elements associated with an application based on the position of the AR/VR-capable device relative to the tracking point, and generating, by operation of a processor, a GUI comprising the first plurality of GUI elements arranged within a volume of a cylinder according to the first arrangement, wherein the cylinder is centered on the tracking point.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein provide graphical user interfaces (GUIs) which are formed around a cylindrical surface and exist on multiple levels of the cylindrical surface in an AR and/or VR environment. The GUIs are dynamically generated and navigated by a user according to the relative position and/or gaze of the user. When the user physically walks around a tracking point of the AR and/or VR environment, the movement of the user is tracked and the GUI changes based on the position of the user relative to the tracking point. Furthermore, embodiments disclosed herein monitor the gaze of the user, and modify the GUI to bring a given GUI element that is the focus of the user's gaze nearest to the user's location when viewed through an AR and/or VR display device.

When a user selects a GUI element via a controller, the selected GUI element is shifted upward, and additional GUI elements associated with the selected GUI element are outputted in its place in the GUI. To move "back" or to a higher level menu, the user may focus their gaze at one of the GUI elements which are positioned on higher levels of the GUI. Furthermore, if a number of levels of the GUI and/or a height of the GUI exceed a threshold, the GUI grows outward near the topmost levels. Further still, the user may spin (or rotate) the GUI using a controller, allowing the user to navigate the options presented in the GUI more easily.

Figure 1:
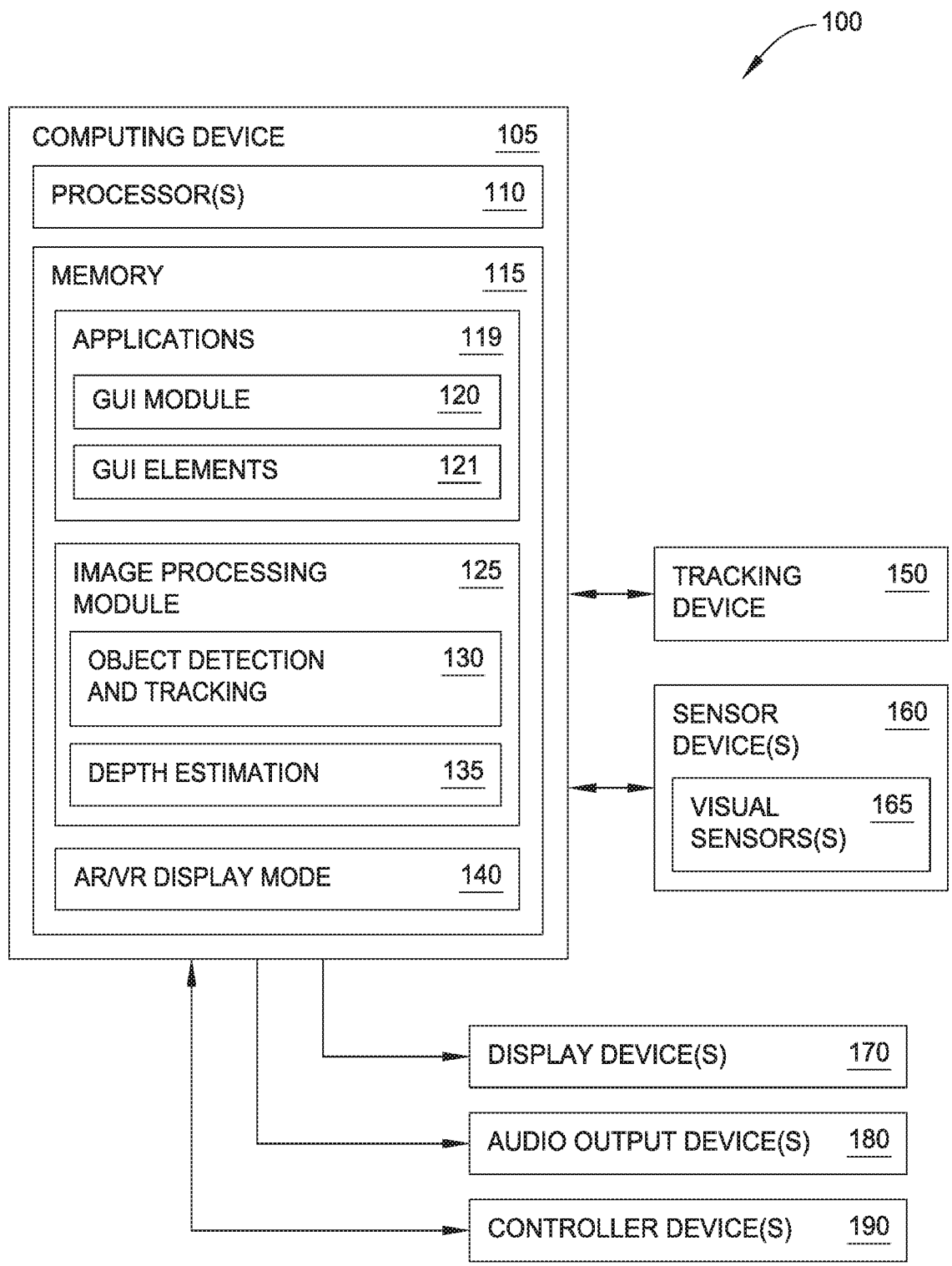
FIG. 1 illustrates an exemplary interactive environment, according to one embodiment.

FIG. 1 illustrates an exemplary interactive environment, according to one embodiment. Within a system 100, a computing device 105 communicates with one or more sensor devices 160, one or more display devices 170, and one or more audio output devices 180. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. The mobile computing device may be configured to physically and removably attach with a body-worn assembly.

Computing device 105 comprises, without limitation, a processor 110 and memory 115. The processor 110 generally retrieves and executes programming instructions stored in the memory 115. Processor 110 is included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the interactive environment. The program code is generally described as various functional "modules" within memory 115, although alternate implementations may have different functions and/or combinations of functions. Within memory 115, one or more applications 119 are depicted. The applications 119 are representative of any type of computing application which provides AR and/or VR functionality, such as a video game, storytelling application, audio/video playback applications, and the like. As shown, each application 119 includes a graphical user interface (GUI) module 120. Although depicted as a component of the applications 119, in some embodiments, the GUI module 120 is separate from the applications 119. For example, the GUI module 120 may be a component of an operating system (not pictured) of the computing device 105.

The GUI module 120 is configured to generate and output GUIs for the applications 119. The GUIs generated by the GUI module 120 are cylindrically shaped virtual objects that are formed around the tracking device 150. The cylindrical GUIs include GUI elements 121 of a given application 119. The GUI elements 121 include, without limitation, menus, menu items, text, game elements, and any other type of graphical object that may be selected by a user. The tracking device 150 generally serves as a tracking point used to orchestrate the AR and/or VR experience of the user. In at least one embodiment, the tracking device 150 is a light-emitting beacon. In such embodiments, the sensor devices 160 use the light emitted by the tracking device 150 to determine the user's position in the interactive environment relative to the tracking device 150. Similarly, the sensor devices 160 may be used to monitor the gaze of the user relative to the tracking device 150. For example, by measuring the light emitted by the tracking device 150, the sensor devices 160 may determine the position of the user relative to the tracking device. However, the tracking device 150 is representative of any type of tracking system that can track a user's position and/or gaze, including feature-based tracking systems, inside-out tracking systems, outside-in tracking systems, visual inertial odometry systems, camera-based tracking systems, laser-based tracking systems, non-light-emitting beacon tracking systems, and range sensor systems.

The sensor devices 160 may be of any suitable type(s) and configured to sense information regarding the interactive environment. Some non-limiting examples of sensor devices 160 include visual sensors 165, pressure sensors, acceleration sensors, and temperature sensors. The visual sensors 165 can include cameras configured to sense visible light and/or infrared light. In some embodiments, the sensor devices 160 may be included with (or within) the computing device 105. For example, where the computing device 105 is a smartphone or tablet device, the sensor devices 160 may include camera(s), inertial motion units (IMUs), etc. that included within the smartphone/tablet device. In some embodiments, the sensor devices 160 comprise sensors that are external to the computing device 105, e.g., a visual sensor 165 included with a head-worn device.

The memory 115 further includes an image processing module 125 configured to perform processing of visual information captured by visual sensors 165. The image processing module 125 may include any number of image processing functions, such as an object detection and tracking sub-module 130 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 135 configured to dynamically estimate a distance of the detected objects from the user.

The system 100 includes one or more display devices 170, one or more audio output devices 180, and one or more controller devices 190. The display devices 170 may include visual displays of any suitable type. The display devices 170 may include any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. In some embodiments, the display devices 170 are included within the computing device 105 (e.g., a main display screen of the smartphone, tablet device, etc.). In other embodiments, the display devices 170 are separate from the computing device 105 but are configured to superimpose virtual imagery onto physical objects in the user's field of view. For example, the display devices 170 may be integrated into a body-worn device such as a headset, and the display devices 170 may be configured as an eyepiece or lens worn in front of the user's eye. In another example, the display devices 170 may be integrated into other devices that are carried or handled by the user, or having any other suitable user interaction during the interactive experience. For example, while participating in a gameplay experience, the user can carry a toy blaster that includes an optical sight for aiming, and the display devices 170 may be integrated in the optical sight.

The audio output devices 180 may include conventional audio speakers having any suitable form factor (e.g., stand-alone, integrated in a stereo, headphones, etc.), as well as devices using alternative methods of producing sound perceptible by a user, such as bone conduction transducers in a body-worn device. In some embodiments, the audio output devices 180 are included within the computing device 105 (e.g., speakers of the smartphone, tablet device, etc.). In other embodiments, the audio output devices 180 are separate from the computing device 105. The controller devices 190 are representative of any type of device capable of providing input to the computing device 105, such as joysticks, mice, hand-held game controllers, controllers integrated into the computing device 105, and the like.

In some embodiments, the computing device 105 is configured to operate in an augmented reality (AR) mode, generally configured to superimpose virtual images such as the GUIs generated by the GUI module 120, characters, objects, and/or dynamic visual effects into the user's natural field of view of the environment using a display device 170. The field of view of the user is generally determined using sensor devices 160 such as the visual sensors 165. In some embodiments, the computing device 105 is configured to operate in a virtual reality (VR) mode, generally replacing the user's natural field of view of the environment with virtual imagery using display device 170.

For example, the display device 170 could superimpose a virtual character to appear seated on a physical chair detected within the environment. The display of the virtual character on the display device 170 is dynamically adjusted based on the user's field of view (orientation), the determined depth of the chair from the user, and so forth. Similarly, the display device 170 can superimpose GUIs generated by the GUI module 120 to appear in within the environment. Again, the display of the GUIs is dynamically adjusted based on the user's field of view (orientation), the determined depth of the GUI from the user, and so forth.

In some embodiments, the computing device 105 is configured to dynamically select one of the AR mode and VR mode based on the sensed characteristics of the environment and/or based on the current state of a given application 119. The selection of the AR or VR modes is represented as AR/VR display mode 140 and included in memory 115. For example, the visual sensors 165 may detect that the environment is extremely bright (e.g., when the user is in direct sunlight), which may make it difficult for a user to view overlaid information using the display device 170. In another example, a virtual setting of an application 119 specifies a night-time setting. In these examples, the VR mode may be enabled in order to substantially isolate the user's field of view from the surrounding physical environment and thereby reduce the amount of light received from the environment. In both cases, dynamic selection of the AR/VR display mode 140 can improve the immersive nature of the interactive environment, whether through ensuring the user is able to suitably view the overlaid information or through providing a more realistic setting consistent with the virtual setting.

Switching between AR and VR modes may be accomplished through any suitable technique. In some embodiments, a user-worn headset includes a light-blocking assembly comprising cross polarizers that are disposed in front of each of the user's eyes. When one or both of the cross polarizers are rotated, the light from the physical environment that is transmitted to the user's eyes can be selectively reduced, and can substantially isolate the user's field of view from the physical environment (e.g., a VR mode). Rotating the cross polarizers may be performed manually (e.g., the user turns a knob linked with the cross polarizers), or electronically (e.g., a motor receives control signals from computing device 105 based on the AR/VR display mode 140 and rotates the cross polarizers. In other embodiments, the light-blocking assembly includes a partially or fully transparent "see-through" display, such as an OLED or side-lit or naturally lit LCD. The display receives control signals from computing device 105 based on the AR/VR display mode 140 and can selectively darken the display to substantially isolate the user's field of view from the physical environment.

The display devices 170 are generally used within system 100 to provide a compact AR/VR display that may be carried or worn by the user during the interactive experience. As discussed above, the display devices 170 may include devices that are separate from the display device of a mobile computing device (e.g., a smartphone or tablet device). Implementations of the compact AR/VR display that use a smartphone or other mobile computing device offer several advantages. For example, implementations able to adapt the user's smartphone provide a reduced manufacturing cost of the compact AR/VR display, as no separate computing hardware or display hardware need be included. A camera included in the smartphone may be used as visual sensor 165 to dynamically provide information regarding the physical environment and the user's field of view. Using a smartphone may also provide increased convenience to the user, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the user's eyes. Depending on the currently selected mode (AR or VR), the optical arrangement is further configured to transmit some or all of the light from the physical environment to the user's eyes. It may be beneficial to design a compact AR/VR display to have a relatively small size and weight. Smaller and lighter body-worn implementations allow for use by younger users or other users with reduced size and/or strength, and are generally less fatiguing. The positioning of the mobile computing device and/or the optical arrangement can also be selected to reduce a moment on the user. For example, in a head-worn compact AR/VR display, including a smartphone in a position closer to the user's head provides a smaller moment (e.g., corresponding to strain on the neck or upper body) than an implementation in which the smartphone is positioned further from the user's head. A compact (small-sized) implementation also reduces manufacturing costs through reduced material and process requirements. A compact implementation may also be more aesthetically pleasing for users, when compared with a large or bulky implementation.

Using a mobile computing device in conjunction with an optical arrangement can provide the user a reasonably good field of view, which enhances the immersive nature of the interactive environment. Generally, the size of the user's field of view is proportional to size of the elements included in the optical arrangement for a particular distance from the user's eyes.

Figure 2:
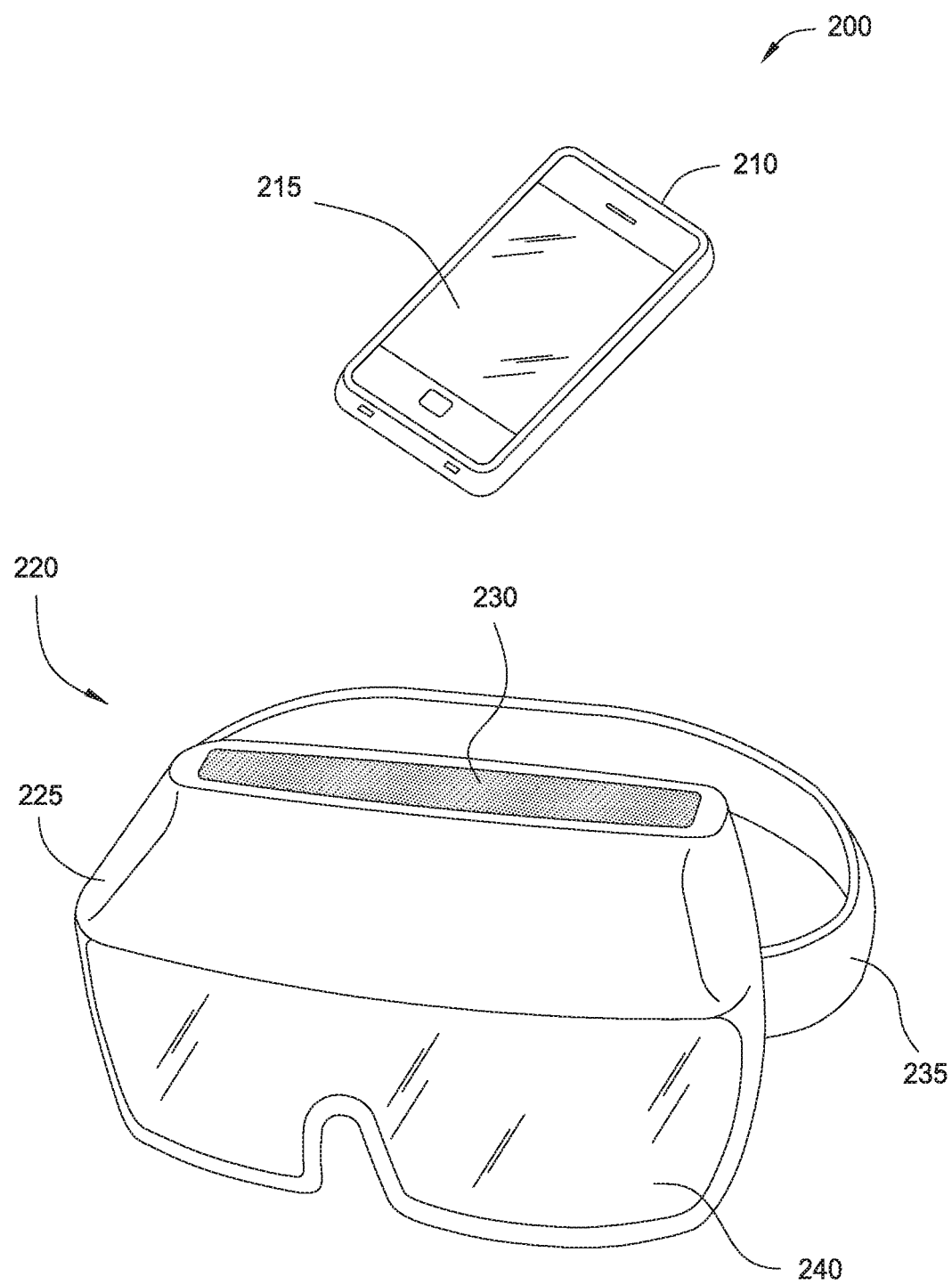
FIG. 2 is a diagram illustrating an AR/VR headset configured to interact with a mobile computing device, according to one embodiment.

FIG. 2 is a diagram illustrating an AR/VR headset 220 configured to interact with a mobile computing device, according to embodiments described herein. As shown, the diagram 200 depicts a mobile computing device 210 and an AR/VR-capable display device in the form of an AR/VR headset 220. The AR/VR headset 220 generally includes a mount assembly 225 (or "mobile device adapter"), a head strap 235, and a mirrored lens 240. The mount assembly 225 defines an opening 230 into which the mobile computing device 210 is received. Generally, insertion of the mobile computing device 210 into the opening 230 provides a removable attachment of the mobile computing device 210 with the mount assembly 225 and further arranges the display 215 (representing an example of the display device 170 of FIG. 1) with a predefined position. In the predefined position, the display 215 has a suitable orientation relative to optical components (not shown) included in the AR/VR headset 220. The mount assembly 225 may include any suitable means for removably attaching the mobile computing device 210. The mount assembly 225 is further configured to hold or retain the mobile computing device 210 with a desired position and orientation relative to a wearer of the AR/VR headset 220.

The light generated by the display 215 of the mobile computing device 210 is redirected through the optical components of the AR/VR headset 220 so that the light can be seen by a wearer of the AR/VR headset 220. For example, the generated light could pass through a beam-splitter and reflect off the mirrored lens 240 and into the wearer's eyes. Thus, virtual objects, such as GUIs generated by the GUI module 120, that are displayed using the display 215 appear as if present within the physical environment of the viewer. Advantageously, by leveraging the hardware resources of the mobile computing device 210, the AR/VR headset 220 can be produced and sold at reduced costs, relative to other AR devices containing dedicated computer processors, display devices, and so forth.

Figure 3:
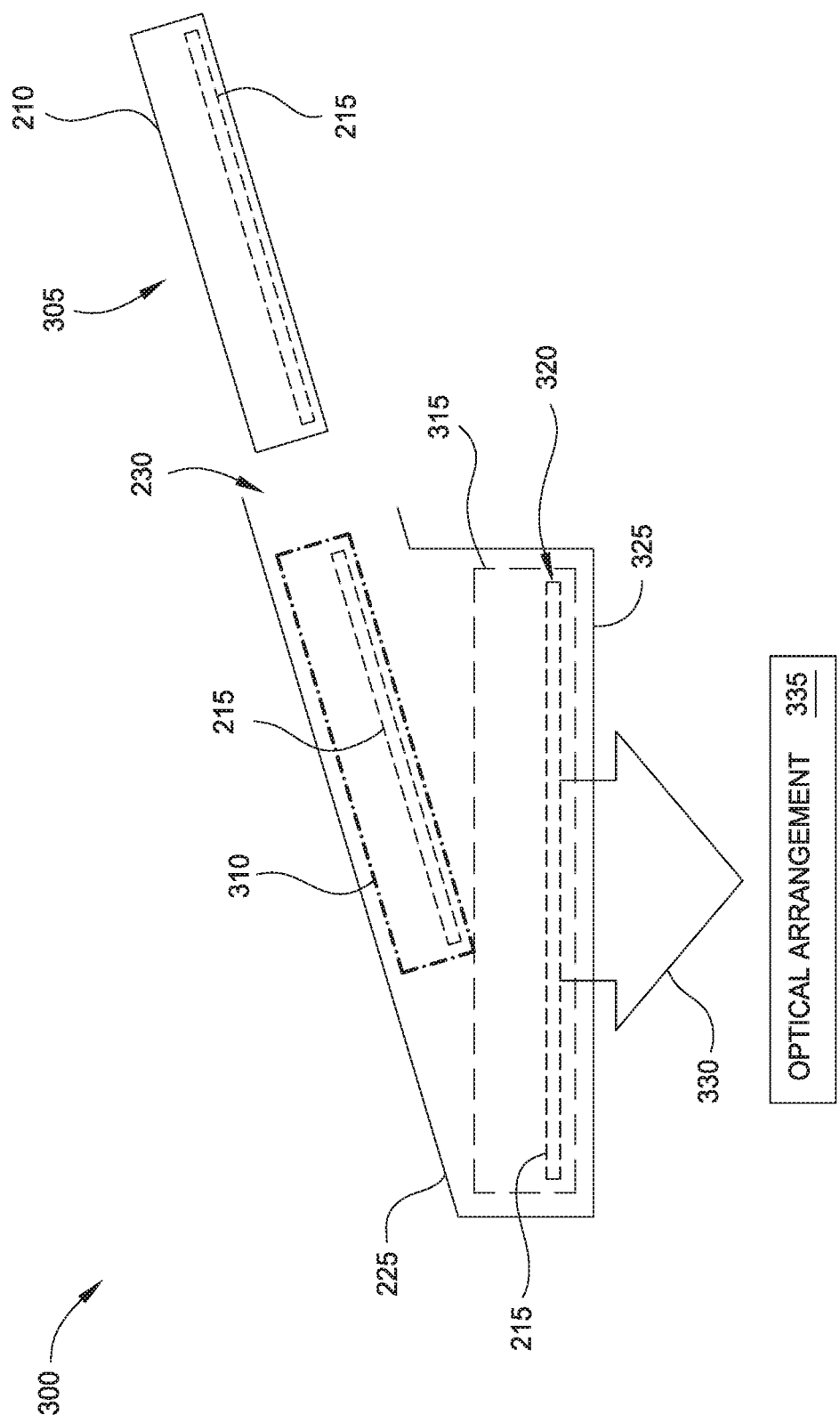
FIG. 3 is a diagram illustrating attachment of a mobile computing device with a mount assembly, according to one embodiment.

FIG. 3 is a diagram illustrating attachment of a mobile computing device with a mount assembly, according to embodiments described herein. More specifically, diagram 300 depicts an exemplary sequence for inserting the mobile computing device 210 into the mount assembly 225. The mount assembly 225 may be formed of one or more elements of any material having suitable strength for retaining the mobile computing device 210. In some embodiments, the mount assembly 225 is formed of a plastic material, which advantageously provides a lighter display device.

The mobile computing device 210 is inserted through an opening 230 formed in the mount assembly 225. The intermediate position 310 represents possible positioning of the mobile computing device 210 before reaching a predefined final position 315. At the predefined final position 315 of the mobile computing device 210, the display 215 of the mobile computing device 210 has a predefined position 320 relative to the optical arrangement 335.

A lower surface 325 of the mount assembly 225 is generally optically transmissive of light 330 generated by the display 215. In some embodiments, the lower surface 325 is formed of an optically transmissive material, such as a plastic or glass, through which light 330 from the display 215 is transmitted. In other embodiments, the lower surface 325 defines an opening through which light 330 from the display 215 is transmitted. For example, the lower surface 325 may support the mobile computing device 210 around a periphery of the mobile computing device 210.

Although not explicitly shown, the mount assembly 225 may include further elements for removably attaching the mobile computing device 210 with the mount assembly 225. For example, a press fit may be formed between the mobile computing device 210 and mount assembly 225 using adjustable corner piece(s), a sliding tray with guide plug, toggle pin(s), a stepped slot, a replaceable tray, etc. For example, the mobile computing device 210 may be inserted into a replaceable tray or other suitable carrier member, which is then inserted to the mount assembly 225 to thereby arrange the display 215 with the predefined position 320. In this way, different carrier members may be used to accommodate different types of mobile computing devices 210 for a particular mount assembly 225.

The removable attachment of the mobile computing device 210 with the mount assembly 225 may have any suitable orientation within an associated display device. The elements of the optical arrangement 335 collectively define a field of view relative to a predefined optical reference point, and the display device is generally designed such that the eye(s) of the viewer is aligned with the optical reference point. To support an AR capability of the display device, the mobile computing device 210 and mount assembly 225 are generally disposed outside of the field of view to allow a viewer to observe the physical environment through the optical arrangement 335. For example, for a head-worn display device in which a line of sight of the viewer corresponds to the field of view of the optical arrangement 335, the mobile computing device 210 and mount assembly 225 may be positioned above, below, or to a side of the viewer's line of sight.

Figure 4A:
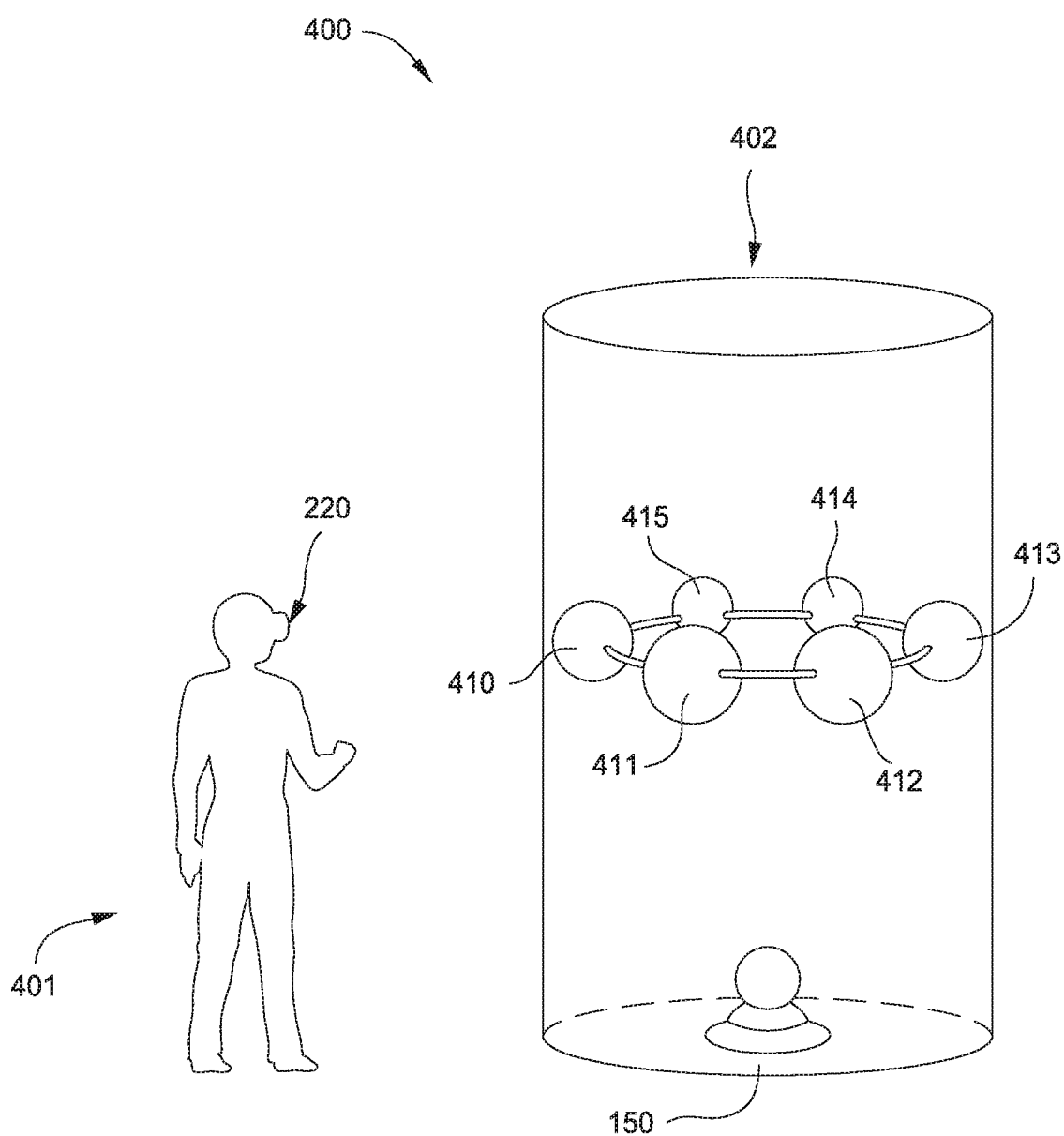
FIGS. 4A-4E depict cylindrical graphical user interfaces for AR devices and/or VR devices, according to various embodiments.

FIG. 4A depicts a three-dimensional (3D), cylindrical graphical user interface 402 for AR devices and/or VR devices, according to one embodiment. As shown, FIG. 4A depicts an interactive environment 400 (e.g., corresponding to the interactive environment 100) which includes a user 401 wearing an AR/VR headset 220. The interactive environment 400 further includes a tracking device 150. The GUI module 120 generates the cylindrical GUI 402, which is cylindrical in shape and is formed around the tracking device 150. As shown, the user 401 is external to (or outside of) the cylindrical GUI 402. The cylindrical GUI 402 includes a plurality of GUI elements 410-415 (each of which is representative of the GUI elements 121 of FIG. 1). According to various embodiments, the cylinder and/or the GUI elements 410-415 of the cylindrical GUI 402 are of any degree of transparency. In at least one embodiment, a radius of the cylinder is defined by the tracking device 150 and a surface of the cylinder. The GUI elements 410-415 are arranged around the surface and/or within the volume of the cylinder of the cylindrical GUI 402. As described above, the GUI elements 410-415 may correspond to any type of graphical object and/or text. In one example, the cylindrical GUI 402 is a map provided by a video game application 119, and the GUI elements 410-415 correspond to planets (or other locations) the user can select during a given application state of the video game application 119. For example, the user may select one of the GUI elements 410-415 using a controller device 190, which may bring up additional GUI elements (e.g., additional map information), a level of the video game application 119 corresponding to the selected GUI element 410-415, and the like.

The GUI module 120 may generate an arrangement of the GUI elements 410-415 based on one or more of the gaze of the user, the location of the user relative to the tracking device 150, and one or more attributes of the GUI elements 410-415. The attributes of the GUI elements 410-415 may include levels of importance, degrees of difficulty of associated application 119 elements, predefined ordering attributes, and the like. For example, continuing with the video game application 119, the levels of the video game application 119 associated with the GUI elements 410-415 may have a respective level of difficulty relative to the other levels in the video game application 119. As such, the GUI elements 410-415 may also be associated with metadata reflecting the corresponding level of difficulty. Assuming the GUI element 410 has the lowest level of difficulty, the GUI module 120 may output the GUI element 410 to be nearest to the user 220, facilitating selection of the least difficult level of the video game application 119 by the user 220 via the controller 190. In at least one embodiment, the GUI element 410 is highlighted for selection by the controller 190. Therefore, in such embodiments, the location of the user 401 relative to the tracking device 150 is determined as described above. The GUI module 120, responsive to receiving location information describing the location of the user, generates an arrangement of the GUI elements 410-415 such that the GUI element 410 is positioned nearest to the user 401. However, in some embodiments, the GUI module 120 generates random arrangements of the GUI elements 410-415.

Figure 4B:
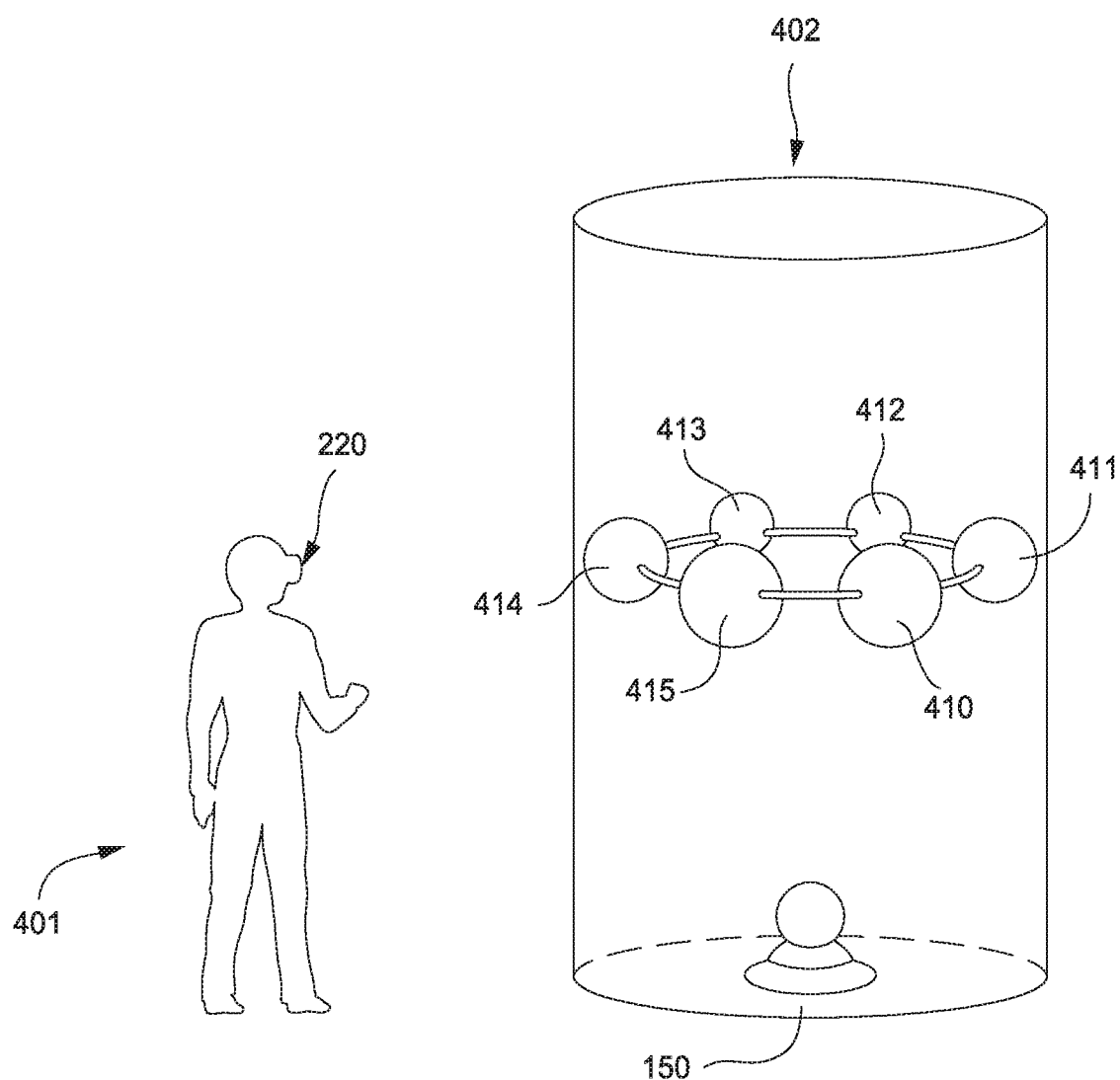

FIG. 4B depicts the cylindrical GUI 402 according to a different arrangement of the GUI elements 410-415 relative to the arrangement depicted in FIG. 4A, according to one embodiment. As shown, the GUI element 414 is depicted as being nearest to the user 220. The GUI module 120 may generate the arrangement of GUI elements 410-415 depicted in FIG. 4B based on any number of factors. For example, the GUI module 120 may determine that the user walked around the tracking device 150, and is now positioned nearest to the GUI element 414. In another example, the user 401 may use the controller device 190 to provide input specifying to rotate or spin the cylindrical GUI 402 (e.g., by a predefined number of degrees, radians, GUI elements, etc.). Doing so changes the arrangement of the GUI elements 410-415 when viewed via the AR/VR headset 220. Further still, the user 401 may focus his or her gaze at the GUI element 414 while remaining outside of the cylindrical GUI 402. In response, the GUI module 120 may modify the cylindrical GUI 402 to bring the GUI element 414 nearest to the user 401, and highlight the GUI element 414 for selection.

Figure 4C:
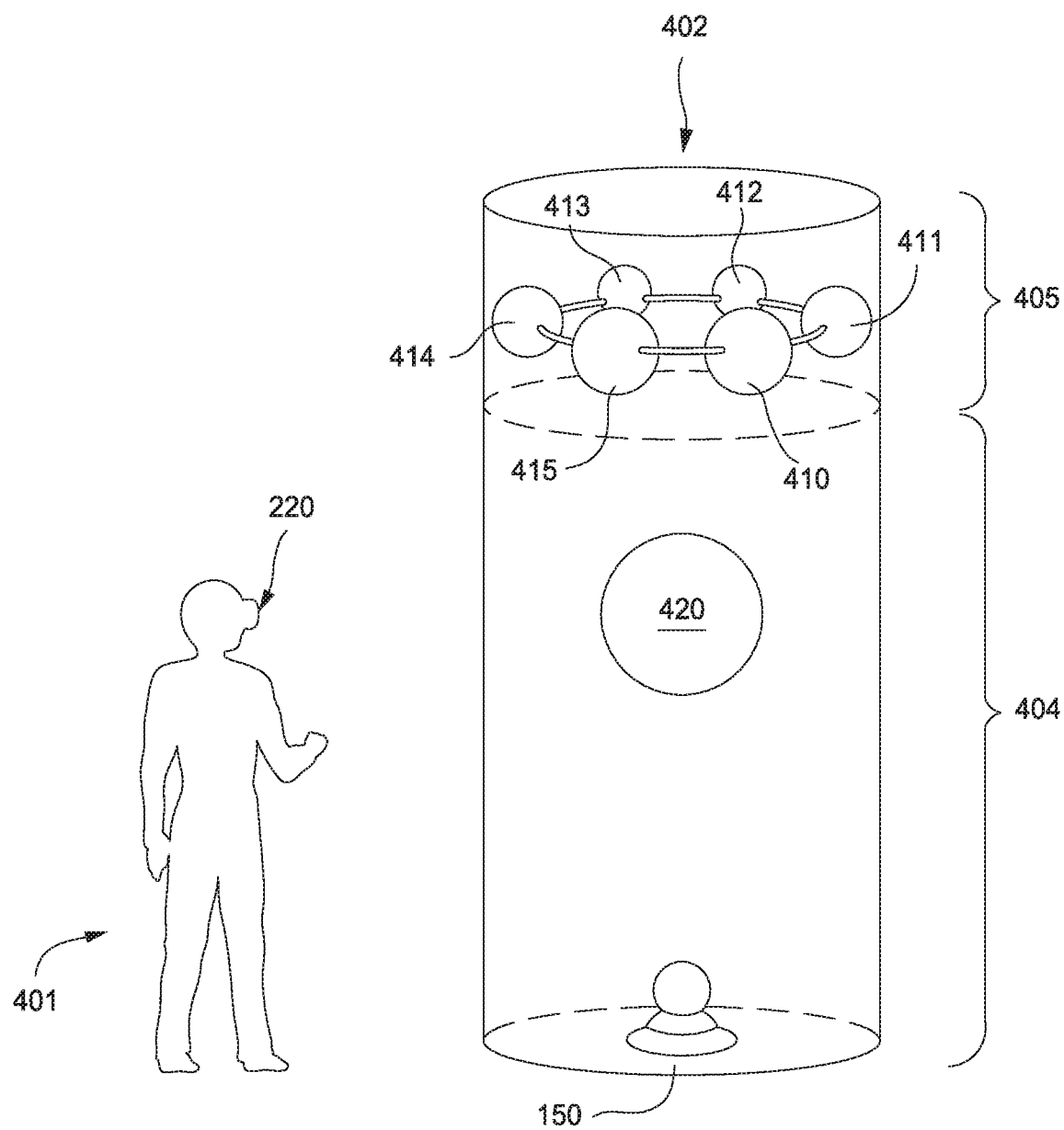

FIG. 4C depicts an embodiment where the user 401 has selected the GUI element 414. As shown, the cylindrical GUI 402 now includes a GUI element 420 within the volume of the cylindrical GUI 402. The GUI element 420 is associated with the GUI element 414, e.g., when the user selects the GUI element 414, the GUI module 120 identifies the GUI element 420 in the GUI elements 121 of the corresponding application 119, and outputs the GUI element 420 in the cylindrical GUI 402. Furthermore, as shown, the GUI 402 continues to depict the GUI elements 410-415. However, the GUI elements 415 have been shifted upward to a vertical position in the cylindrical GUI 402 that is above the vertical position of the GUI element 420. Illustratively, the GUI element 420 may be considered to be on a level 404 that is below the level 405 of the GUI elements 410-415.

Figure 4D:
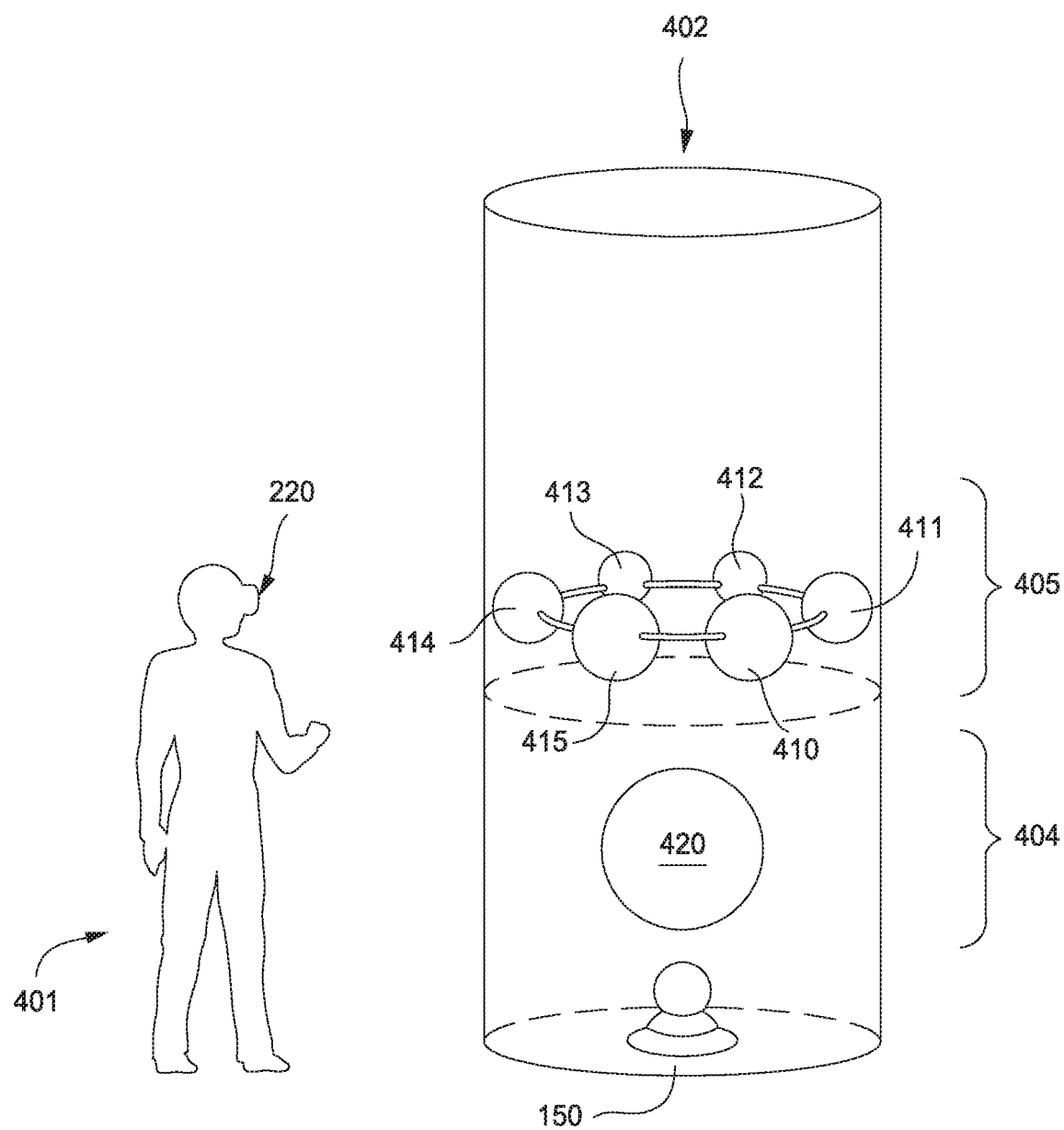

As previously stated, to navigate "back" to a previous menu within the cylindrical GUI 402, the user 401 may direct their gaze upward to one of the GUI elements 410-415, which causes the GUI module 120 to modify the cylindrical GUI 402 accordingly. FIG. 4D depicts such an embodiment. As shown, the GUI module 120 has shifted the GUI elements 410-415, 420 down from their position in FIG. 4C. In at least one embodiment, the GUI module 120 shifts the GUI elements 410-415, 420 down upon determining the gaze of the user 401 is focused upward at one of the GUI elements 410-415 for a duration of time that exceeds a predefined time threshold. In other embodiments, the GUI module 120 shifts the GUI elements 410-415, 420 down upon determining the gaze of the user 401 is focused upward at one of the GUI elements 410-415 and responsive to receiving input from the controller device 190 selecting the one of the GUI elements 410-415 that is subject of the gaze of the user 401. Therefore, continuing with the map example, in FIG. 4C, the user may prefer to play a different level of the video game application 119, rather than the level associated with GUI element 420. By looking up at one of the GUI elements 410-415, the user 401 may go "back" one menu level to select one of the GUI elements 410-415. Similarly, if the user 401 desires to return to the interface associated with GUI element 420, the user 401 may focus their gaze downward to the GUI element 420 in FIG. 4D. In at least one embodiment, the user 401 may also select the GUI element 420 via the controller device 190.

Figure 4E:
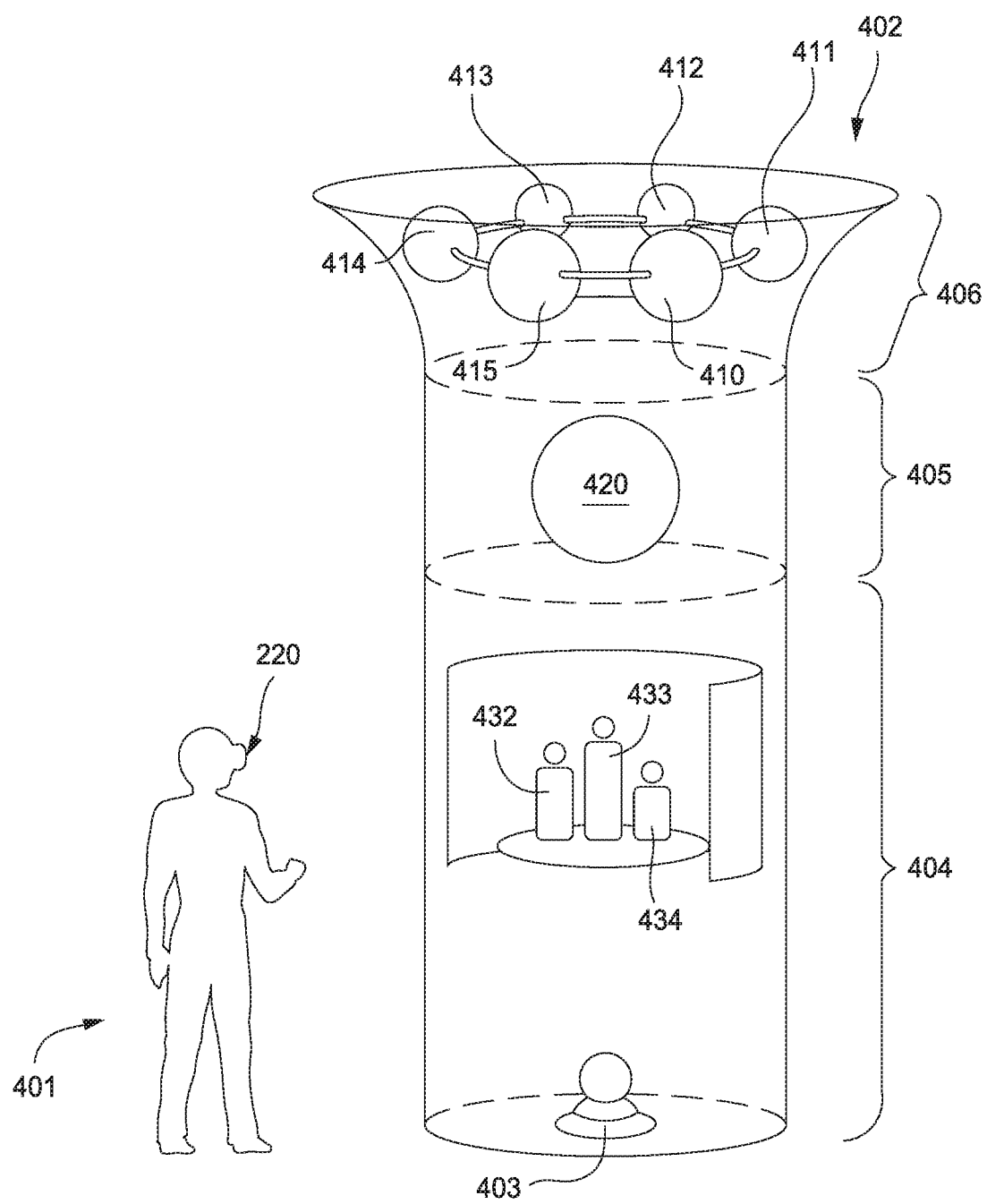

FIG. 4E depicts an embodiment where the user 401 has selected GUI element 420 of the cylindrical GUI 402 of FIG. 4C via the controller device 190. As shown, the GUI 402 now includes additional GUI elements 431-434 on level 404 (e.g., at the eye-level of the user 401). The GUI element 431 includes text, which is depicted on a portion of the far surface (relative to the position of the user 401) of the cylindrical GUI 402. As shown in greater detail in FIG. 5 below, in some embodiments, the near portion of the cylindrical GUI 402 is removed to allow the user 401 to more easily view the text GUI element 431 and graphical GUI elements 432-434. The cylindrical GUI 402 of FIG. 4E further depicts the GUI element on level 405, which is at a vertical position of level 404. Similarly, GUI elements 410-415 are on a level 406 of the cylindrical GUI 402, above levels 404-405. As shown, the level 406 of the cylindrical GUI 402 expands outward to convey additional information. In such embodiments, the radius of the cylinder defined by at least one point of the level 406 is larger than the radii of the cylinder at the levels 404, 405. Therefore, the GUI elements 410-415 may be projected on the expanded surface of the GUI 402 at the level 406. As stated, the GUI manager 120 may expand the topmost portion of the GUI 402 based on any number of factors, such as a number of levels of the GUI 402, a number of GUI elements depicted in the GUI 402, a height of the GUI 402.

Figure 5:
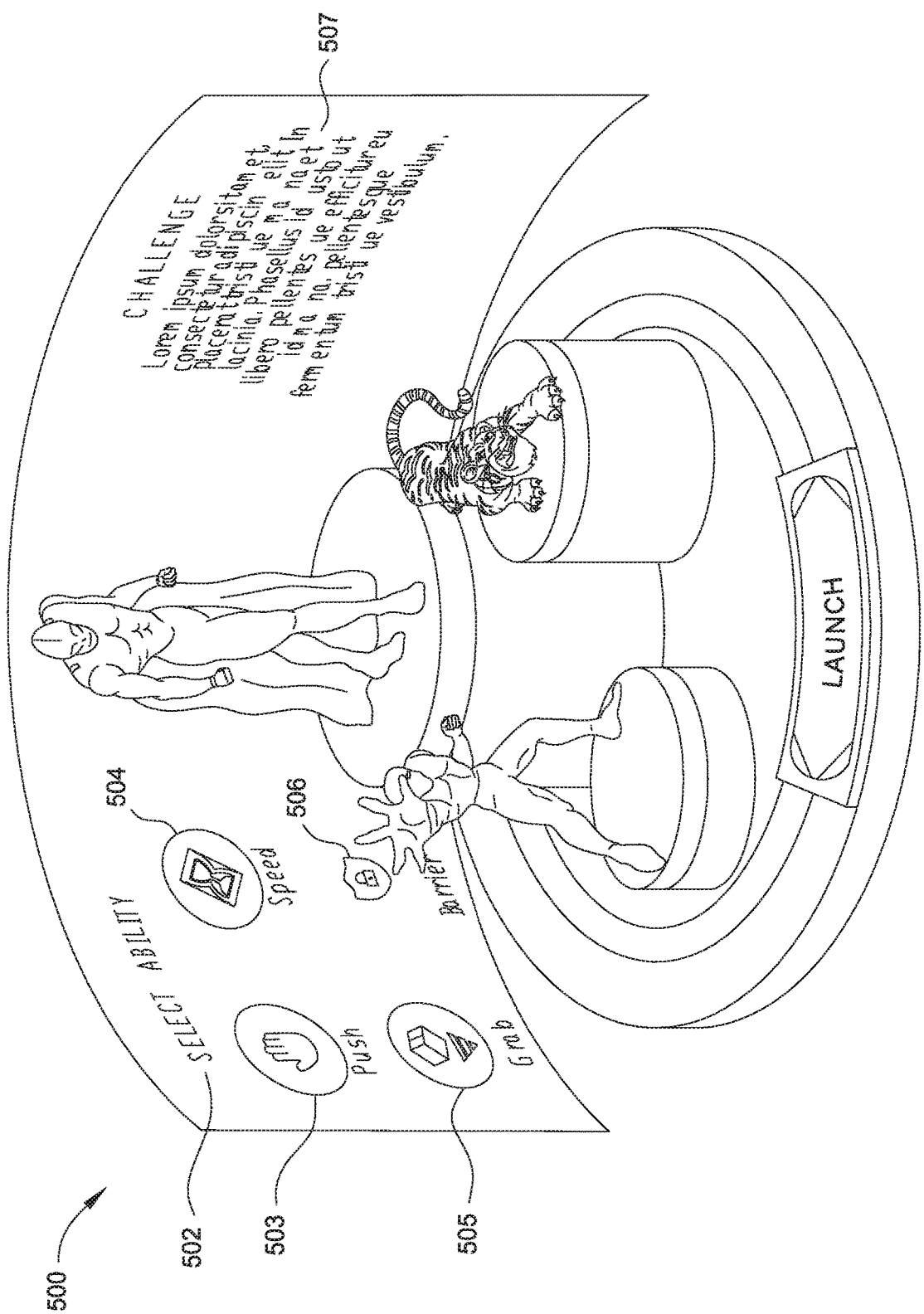
FIG. 5 depicts a cylindrical graphical user interface for AR devices and/or VR devices, according to one embodiment.

FIG. 5 depicts a cylindrical graphical user interface 500 generated by the GUI module 120, according to one embodiment. As shown, the cylindrical GUI 500 includes a portion of a cylinder 502, e.g., the portion of the cylinder farthest from the location of the user. However, as shown, the entire cylinder 502 is not depicted, such that a portion of the cylinder 502 nearest to the user does not obscure information, as the user may be positioned outside of the cylinder 502. As shown, the cylindrical GUI 500 includes a plurality of selectable GUI elements 503-507, text GUI elements 507, and game characters 508-510. Generally, if a given GUI element 121 of an application 119 includes text (e.g., menus, instructions, etc.), the GUI module 120 generates GUIs that include the text on the far wall of the cylinder. Doing so conveys the information clearly to the user. Furthermore, if the user moves around the tracking device 150 (not depicted for the sake of clarity in FIG. 5), the GUI 500 "tracks" the user, such that the GUI 500 appears substantially similar when viewed from any position of the user relative to the tracking device 150.

Figure 6:
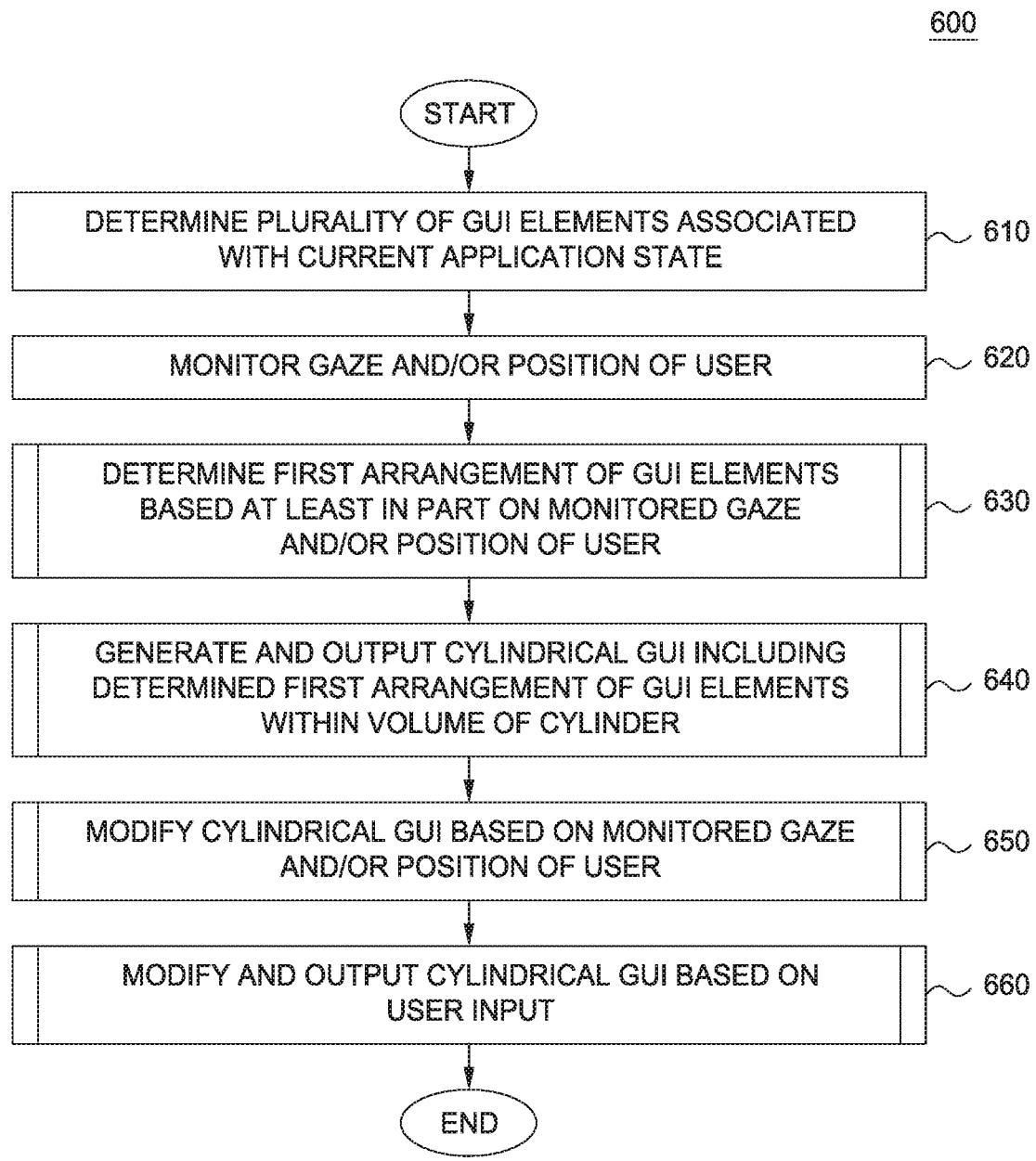
FIG. 6 is a flow chart illustrating a method to provide a cylindrical graphical user interfaces for AR devices and/or VR devices, according to one embodiment.

FIG. 6 is a flow chart illustrating a method 600 to provide a cylindrical graphical user interfaces for AR devices and/or VR devices, according to one embodiment. As shown, the method 600 begins at block 610, where the GUI module 120 determines a plurality of GUI elements 121 associated with the current state of an application 119. For example, if the current state of an application 119 executing on the computing device 105 is at a "main menu" state, the GUI module 120 determines the GUI elements 121 associated with the main menu of the application 119. Such GUI elements 121 may include text, graphical objects, and any other type of content. At block 620, the gaze and/or position of the user are monitored. As previously stated, the sensor devices 160 may detect light from the tracking device 150. The image processing module 125 may process the light received by the sensor devices 160 to determine where the user is positioned relative to the tracking device 150. Similarly, the image processing module 125 may leverage the light from the tracking device 150 and/or visual data captured by the sensor devices 160 to determine where the gaze of the user is focused. Generally, the gaze and/or position of the user are continuously monitored.

At block 630, described in greater detail with reference to FIG. 7, the GUI module 120 determines a first arrangement of the GUI elements 121 determined at block 610 based at least in part on the monitored gaze and/or position of the user. However, as previously stated, the GUI module 120 may determine the first arrangement of GUI elements 121 based on any number and type of factors, including randomly generating the first arrangement of GUI elements 121. At block 640, described in greater detail with reference to FIG. 8, the GUI module 120 generates and outputs a cylindrical GUI including the determined first arrangement of the GUI elements 121. As previously stated, the cylindrical GUI is shaped like a cylinder, is of some degree of transparency, and includes the arrangement of GUI elements within the volume of the cylinder. Furthermore, the cylindrical GUI is outputted to appear between the user and the tracking device 150, such that the user views the cylindrical GUI externally. The user may view the cylindrical GUI via the AR/VR headset 220.

At block 650, the GUI module 120 modifies the cylindrical GUI by continuing to monitor the gaze and/or position of the user as described above. For example, if the user gazes at a first GUI element 121, the GUI module 120 may rotate the GUI and/or generate a different arrangement of GUI elements 121 to bring the first GUI element nearest to the user. At block 660, the GUI module 120 modifies and outputs the cylindrical GUI based on user input as described above. For example, the user may use the controller device 190 to specify to spin or rotate the cylindrical GUI, select GUI elements 121, and the like. Generally, as an application 119 executes on the computing device 105, the steps of the method 600 may be repeated to provide the cylindrical GUI.

Figure 7:
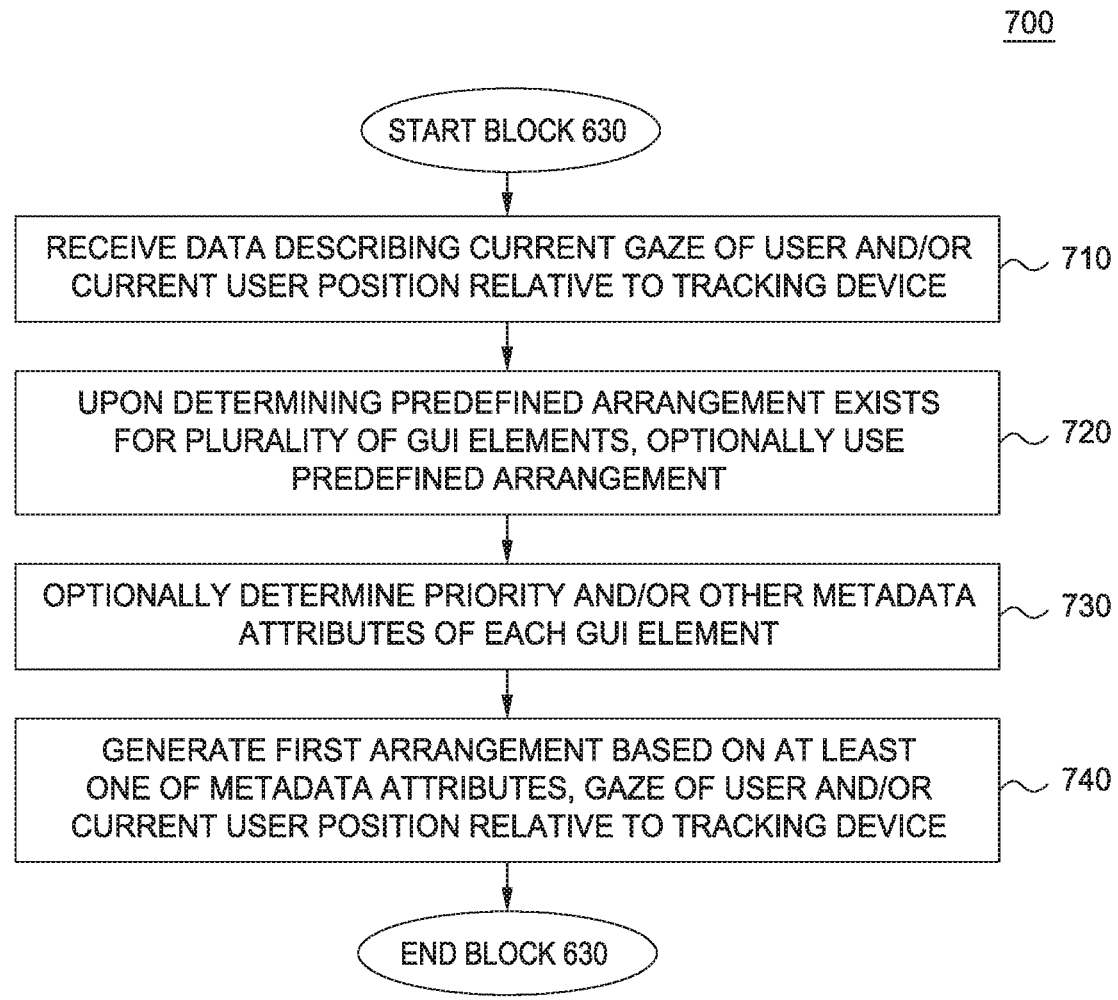
FIG. 7 is a flow chart illustrating a method to determine a first arrangement of GUI elements, according to one embodiment.

FIG. 7 is a flow chart illustrating a method 700 corresponding to block 630 to determine a first arrangement of GUI elements, according to one embodiment. As shown, the method 700 begins at block 710, where the GUI module 120 receives data describing the current gaze of the user and/or the current position of the user relative to the tracking device 150. At block 720, the GUI module 120 determines that a predefined arrangement exists for the plurality of GUI elements 121 identified at block 610, and optionally uses the predefined arrangement as the first arrangement. At block 730, the GUI module 120 optionally determines metadata attributes, including any priority and/or ordering attributes of each GUI element 121. For example, the GUI elements 121 may include metadata specifying the relative position of each GUI element 121 in a given arrangement based on the state of the application 119. At block 740, the GUI module 120 generates the first arrangement based on one or more of the predefined arrangement, the metadata attributes, the gaze of the user, and/or the current user position relative to the tracking device.

Figure 8:
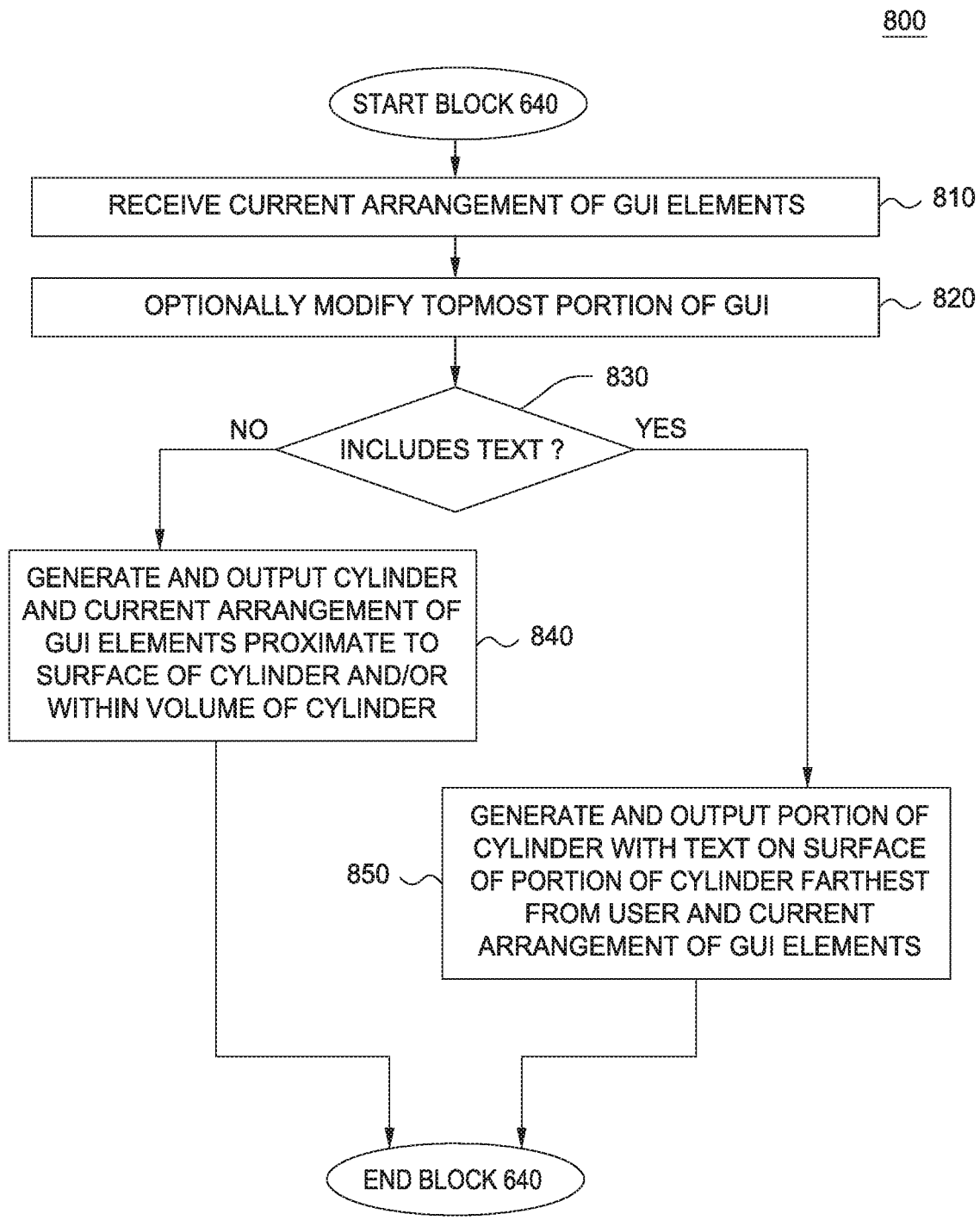
FIG. 8 is a flow chart illustrating a method to generate and output a cylindrical graphical user interface, according to one embodiment.

FIG. 8 is a flow chart illustrating a method 800 corresponding to block 640 to generate and output a cylindrical graphical user interface, according to one embodiment. As shown, the method 800 begins at block 810, where the GUI module 120 receives the arrangement of GUI elements generated at block 740. At block 820, the GUI module 120 optionally modifies the topmost portion of the cylindrical GUI by expanding the topmost portion outward as depicted in FIG. 4E. As stated, the GUI module 120 expands the topmost portion of the cylindrical GUI upon determining one or more of that the height of the cylindrical GUI has exceeded a height threshold, that a number of GUI elements depicted exceeds a threshold, and/or a number of levels of the cylindrical GUI exceeds a threshold. At block 830, the GUI module 120 determines whether at least one GUI element 121 includes text. If the GUI elements 120 do not include text, the method proceeds to block 830. At block 830, the GUI module 120 generates and outputs the cylindrical GUI for display, the cylindrical GUI having the current arrangement of GUI elements proximate to the surface of the cylinder and/or within the volume of the cylinder. Returning to block 830, if at least one GUI element includes text, the method proceeds to block 850, where the GUI module 120 generates and outputs for display a portion of the cylindrical GUI which includes the current arrangement of GUI elements 121. The portion of the cylinder includes a portion of the cylinder furthest from the position of the user. In at least one embodiment, the GUI module 120 includes a subset of the GUI elements 121 due to the entire cylinder not being depicted, and the need to make text readable to the user.

Figure 9:
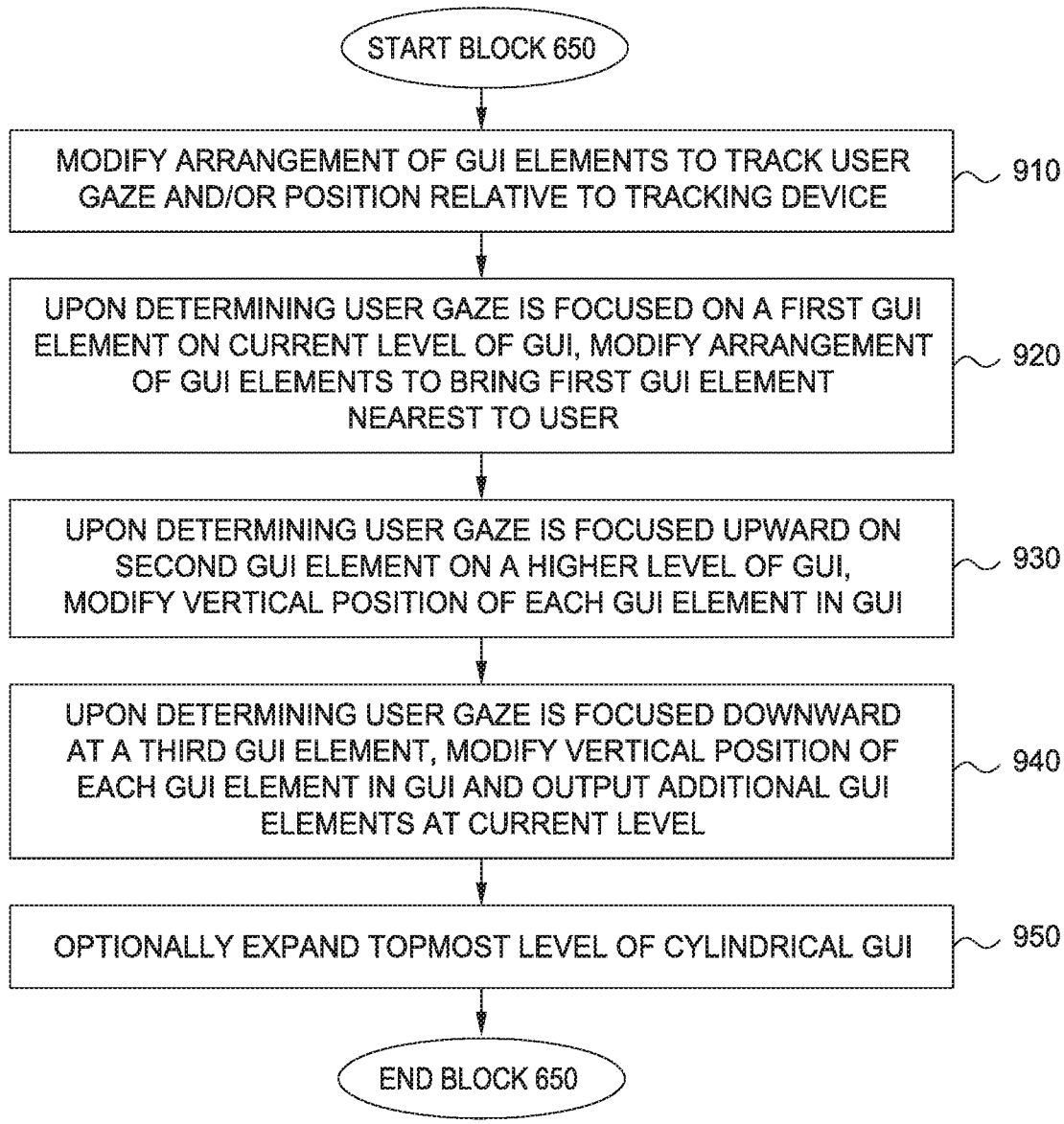
FIG. 9 is a flow chart illustrating a method to modify a cylindrical graphical user interface based on a monitored gaze and/or position of a user, according to one embodiment.

FIG. 9 is a flow chart illustrating a method 900 corresponding to block 650 to modify a cylindrical graphical user interface based on a monitored gaze and/or position of a user, according to one embodiment. As shown, the method 900 begins at block 910, where the GUI module 120 modifies the current arrangement of GUI elements 121 to track the user's gaze and/or current position relative to the tracking device 150. For example, if the user moves from one position to another in the interactive environment 100, the GUI module 120 may modify the arrangement of GUI elements accordingly. However, in some embodiments, the arrangement of GUI elements 121 is not modified. Instead, in such embodiments, it is the perspective of the user that changes, and the arrangement of the GUI elements 121 remains the same. However, when viewed by the user via the AR/VR headset 220, it appears as if the arrangement of GUI elements 121 has changed.

At block 930, the GUI module 120 modifies the arrangement of GUI elements to bring a first GUI element 121 nearest the user on the cylindrical GUI upon determining the user's gaze is focused on the first GUI element. At block 930, the GUI module 120 determines based on the monitored gaze of the user, that the user's gaze is focused on a second GUI element 121, which is on a higher level of the cylindrical GUI (e.g., not at eye-level, such as level 406 of FIG. 4E. In response, the GUI module 120 modifies the vertical position of each GUI element 121 in the cylindrical GUI. For example, the GUI module 120 may lower the vertical position of the second GUI element 121 to be at eye-level with the user. Similarly, other GUI elements may be removed from the cylindrical GUI (e.g., those that were previously at eye-level to the user). Furthermore, the GUI module 120 may modify the depth and/or horizontal position of the GUI elements 121. Similarly, the GUI module 120 may depict new GUI elements 121. At block 940, the GUI module 120 determines that the gaze of the user is focused downward at a third GUI element 121, and modifies the vertical position of each GUI element 121 in the cylindrical GUI. Specifically, the GUI module 120 moves the third GUI element 121 to a higher vertical position (e.g., to the eye-level of the user). Similarly, the GUI module 120 may move other GUI elements 121 vertically and/or within the cylinder. Furthermore, the GUI module 120 may modify the depth and/or horizontal position of the GUI elements 121. At block 950, the GUI module 120 expands the topmost level of the cylindrical GUI as described above, e.g., if the height and/or number of levels of the GUI exceeds a respective threshold.

Figure 10:
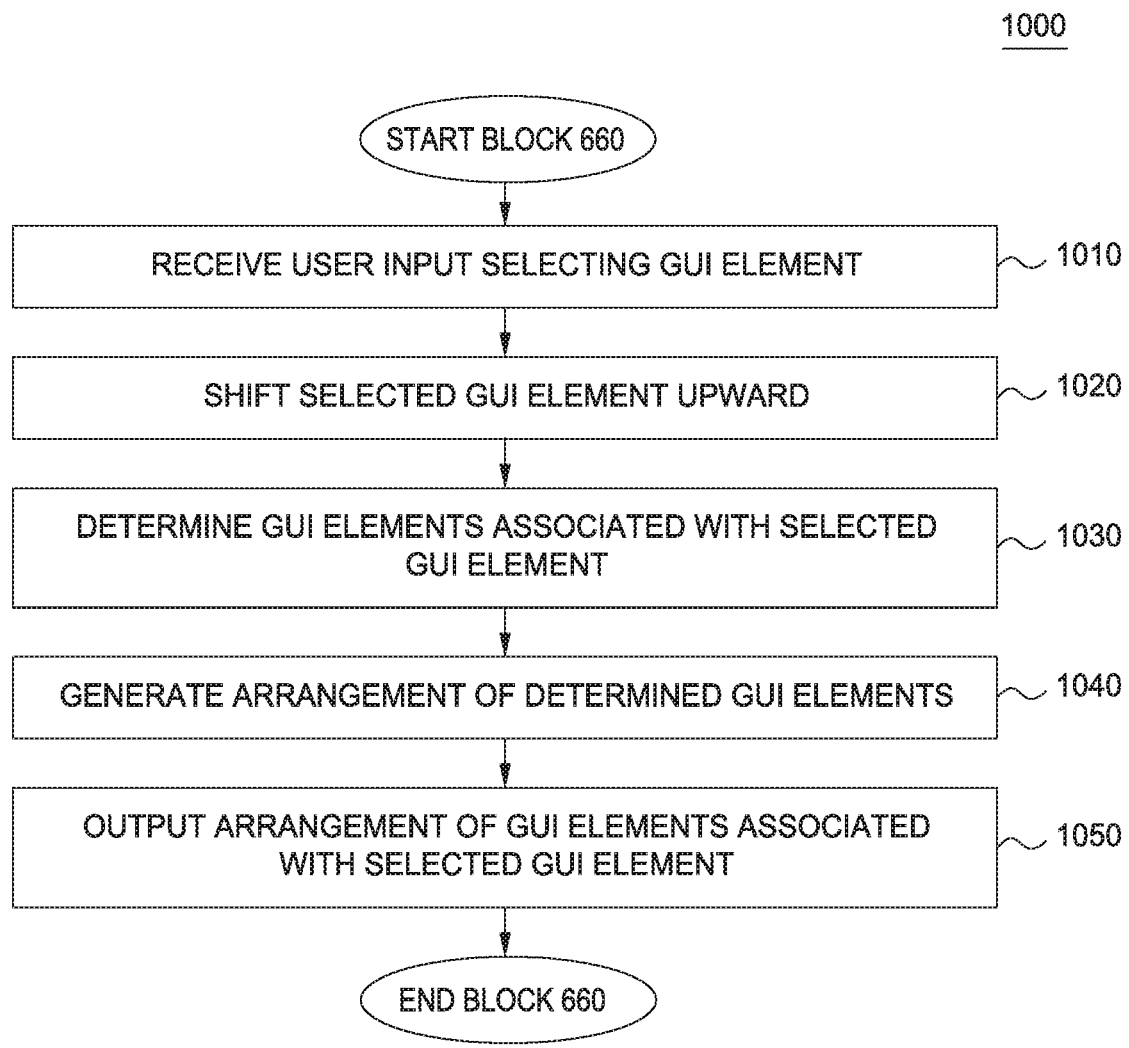
FIG. 10 is a flow chart illustrating a method to modify a cylindrical graphical user interface based on user input, according to one embodiment.

FIG. 10 is a flow chart illustrating a method 1000 corresponding to block 660 to modify a cylindrical graphical user interface based on user input, according to one embodiment. As shown, the method 1000 begins at block 1010, where the GUI module 120 receives user input from a controller device 190 selecting a GUI element 121. At block 1020, the GUI module 120 shifts the selected GUI element 121 (and any other associated GUI elements 121) upward in the cylindrical GUI. At block 1030, the GUI module 120 determines one or more GUI elements 121 associated with the GUI element 121 selected at block 101 (e.g., submenu elements of a selected menu element). At block 1040, the GUI module 120 generates an arrangement of the GUI elements determined at block 1030 as described in greater detail above. At block 1050, the GUI module 120 outputs the determined arrangement of GUI elements 121 associated with the GUI element 121 selected at block 1050.

Advantageously, embodiments disclosed herein provide 3D graphical user interfaces that are formed around a transparent cylindrical object in an AR and/or VR interactive environment. The GUIs are modified based on the gaze and/or position of the user relative to a tracking point. Doing so exposes more information than conventional, 2D interfaces.

In the foregoing, reference is made to embodiments of the disclosure. However, it should be understood that the disclosure is not limited to specific described embodiments. Instead, any combination of the foregoing features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the GUI module 120 could execute on a computing system in the cloud and provide cylindrical GUIs for thin-client applications 119. Doing so allows a user to access these GUIs from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   determining a position of an augmented reality and/or virtual reality (AR/VR)-capable device relative to a position of a tracking point, wherein the tracking point comprises a physical beacon device;
   determining a first arrangement of a first plurality of graphical user interface (GUI) elements associated with an application based on the position of the AR/VR-capable device relative to the tracking point; and
   generating, by operation of a processor, a GUI comprising the first plurality of GUI elements arranged within a volume of a cylinder according to the first arrangement, wherein the cylinder is centered on the tracking point, and wherein, as the AR/VR-capable device moves around the physical beacon device, at least one of the first plurality of GUI elements is moved to remain on a surface of the cylinder farthest from the AR/VR-capable device.

2. The method of claim 1, the method further comprising:
   outputting the GUI for display via an AR/VR-capable display device, wherein a radius of the cylinder is defined by the position of the physical beacon device and a surface of the cylinder, wherein at least one GUI element of the first plurality of GUI elements in the first arrangement is positioned on the surface of the cylinder, wherein the cylinder is of a first degree of transparency, of a plurality of degrees of transparency.

3. The method of claim 2, wherein a user of the AR/VR-capable device is external to the cylinder and the GUI, further comprising:
   monitoring a gaze of the user;
   determining that the gaze of the user is focused on a first GUI element of the first plurality of GUI elements of the first arrangement;
   arranging the first plurality of GUI elements according to a second arrangement, wherein the second arrangement positions the first GUI element proximate to a position of the surface of the cylinder nearest to the user;
   generating a first modified GUI comprising the first plurality of GUI elements arranged according to the second arrangement within the volume of the cylinder; and
   outputting the first modified GUI on the AR/VR-capable display device.

4. The method of claim 3, further comprising:
   receiving, from a controller device, user input selecting the first GUI element;
   determining a second plurality of GUI elements associated with selecting the first GUI element;

arranging the second plurality of GUI elements according to a third arrangement based on at least one of the gaze of the user and the position of the AR/VR-capable device relative to the physical beacon device;
generating a third modified GUI, comprising:
the second plurality of GUI elements arranged according to the third arrangement within the volume of the cylinder, and
the first plurality of GUI elements according to the second arrangement within the volume of the cylinder, wherein a vertical position of the first plurality of GUI elements within the volume of the cylinder is located above a vertical position of the second plurality of GUI elements within the volume of the cylinder; and
outputting the third modified GUI for display on the AR/VR-capable display device.

5. The method of claim 4, further comprising:
determining that the gaze of the user is focused upward on one of the first plurality of GUI elements;
generating a fourth modified GUI comprising the first plurality of GUI elements according to the second arrangement proximate to a vertical position within the volume of the cylinder proximate to the vertical position of the second plurality of GUI elements within the volume of the cylinder in the third modified GUI, wherein generating the fourth modified GUI further comprises at least one of:
(i) removing the second plurality of GUI elements from the fourth modified GUI; and
(ii) positioning the second plurality of GUI elements according to the third arrangement proximate to a vertical position within the volume of the cylinder below the vertical position of the first plurality of GUI elements within the volume of the cylinder in the fourth modified GUI; and
outputting the fourth modified GUI for display on the AR/VR-capable display device.

6. The method of claim 5, wherein generating the fourth modified GUI comprises positioning the second plurality of GUI elements below the vertical position within the volume of the cylinder of the first plurality of GUI elements in the fourth modified GUI, the method further comprising:
determining that the gaze of the user is focused downward on one of the second plurality of GUI elements;
generating a fifth modified GUI, comprising:
the second plurality of GUI elements positioned according to a fourth arrangement based on at least one of the gaze of the user and the position of the AR/VR-capable device relative to the physical beacon device, wherein the second plurality of GUI elements are proximate to a vertical position within the volume of the cylinder proximate to the vertical position within the volume of the cylinder of the first plurality of GUI elements in the fourth modified GUI; and
the first plurality of GUI elements proximate to a vertical position within the volume of the cylinder above the vertical position of the second plurality of GUI elements within the volume of the cylinder in the fifth modified GUI; and
outputting the fifth modified GUI for display on the AR/VR-capable display device.

7. The method of claim 2, further comprising:
receiving, from a controller device, user input selecting a first GUI element of the first plurality of GUI elements of the first arrangement;
determining a second plurality of GUI elements associated with selecting the first GUI element;
determining that a second GUI element of second plurality of GUI elements comprises text;
arranging the second plurality of GUI elements according to a second arrangement, wherein the second arrangement positions at least the text proximate to a position on the surface of the cylinder farthest from a user;
generating a first modified GUI comprising the second plurality of GUI elements arranged according to the second arrangement within a volume of a first portion of the cylinder, wherein the first portion of the cylinder is farther from the user relative to a second portion of the cylinder, wherein the second portion of the cylinder is not depicted in the first modified GUI; and
outputting the first modified GUI on the AR/VR-capable display device.

8. The method of claim 2, wherein the AR/VR-capable device comprises a mobile computing device, wherein the AR/VR-capable display device is included in the mobile computing device, wherein the AR/VR-capable display device comprises a mount assembly configured to removably attach with the mobile computing device.

9. An augmented reality and/or virtual reality (AR/VR)-capable device, comprising:
a processor;
a memory containing a program which when executed by the processor performs an operation comprising:
determining a position of the AR/VR-capable device relative to a position of a tracking point, wherein the tracking point comprises a physical beacon device;
determining a first arrangement of a first plurality of graphical user interface (GUI) elements associated with an application based on the position of the AR/VR-capable device relative to the tracking point; and
generating, by operation of the processor, a GUI comprising the first plurality of GUI elements arranged within a volume of a cylinder according to the first arrangement, wherein the cylinder is centered on the tracking point, and wherein, as the AR/VR-capable device moves around the physical beacon device, at least one of the first plurality of GUI elements is moved to remain on a surface of the cylinder farthest from the AR/VR-capable device.

10. The AR/VR-capable device of claim 9, the operation further comprising:
outputting the GUI for display via an AR/VR-capable display device, wherein a radius of the cylinder is defined by the position of the physical beacon device and a surface of the cylinder, wherein at least one GUI element of the first plurality of GUI elements in the first arrangement is positioned on the surface of the cylinder.

11. The AR/VR-capable device of claim 10, wherein a user of the AR/VR-capable device is external to the cylinder and the GUI, the operation further comprising:
monitoring a gaze of the user;
determining that the gaze of the user is focused on a first GUI element of the first plurality of GUI elements of the first arrangement;
arranging the first plurality of GUI elements according to a second arrangement, wherein the second arrangement positions the first GUI element proximate to a position of the surface of the cylinder nearest to the user;

generating a first modified GUI comprising the first plurality of GUI elements arranged according to the second arrangement within the volume of the cylinder; and outputting the first modified GUI on the AR/VR-capable display device.

12. The AR/VR-capable device of claim 11, the operation further comprising:
receiving, from a controller device, user input selecting the first GUI element;
determining a second plurality of GUI elements associated with selecting the first GUI element;
arranging the second plurality of GUI elements according to a third arrangement based on at least one of the gaze of the user and the position of the AR/VR-capable device relative to the physical beacon device;
generating a third modified GUI, comprising:
the second plurality of GUI elements arranged according to the third arrangement within the volume of the cylinder, and
the first plurality of GUI elements according to the second arrangement within the volume of the cylinder, wherein a vertical position of the first plurality of GUI elements within the volume of the cylinder is located above a vertical position of the second plurality of GUI elements within the volume of the cylinder; and
outputting the third modified GUI for display on the AR/VR-capable display device.

13. The AR/VR-capable device of claim 12, the operation further comprising:
determining that the gaze of the user is focused upward on one of the first plurality of GUI elements;
generating a fourth modified GUI comprising the first plurality of GUI elements according to the second arrangement proximate to a vertical position within the volume of the cylinder proximate to the vertical position of the second plurality of GUI elements within the volume of the cylinder in the third modified GUI, wherein generating the fourth modified GUI further comprises at least one of:
(i) removing the second plurality of GUI elements from the fourth modified GUI; and
(ii) positioning the second plurality of GUI elements according to the third arrangement proximate to a vertical position within the volume of the cylinder below the vertical position of the first plurality of GUI elements within the volume of the cylinder in the fourth modified GUI; and
outputting the fourth modified GUI for display on the AR/VR-capable display device.

14. The AR/VR-capable device of claim 13, wherein the AR/VR-capable device comprises a mobile computing device, wherein the AR/VR-capable display device is included in the mobile computing device, wherein the AR/VR-capable display device comprises a mount assembly configured to removably attach with the mobile computing device, wherein generating the fourth modified GUI comprises positioning the second plurality of GUI elements below the vertical position within the volume of the cylinder of the first plurality of GUI elements in the fourth modified GUI, the operation further comprising:
determining that the gaze of the user is focused downward on one of the second plurality of GUI elements;
generating a fifth modified GUI, comprising:
the second plurality of GUI elements positioned according to a fourth arrangement based on at least one of the gaze of the user and the position of the AR/VR-capable device relative to the physical beacon device, wherein the second plurality of GUI elements are proximate to a vertical position within the volume of the cylinder proximate to the vertical position within the volume of the cylinder of the first plurality of GUI elements in the fourth modified GUI; and
the first plurality of GUI elements proximate to a vertical position within the volume of the cylinder above the vertical position of the second plurality of GUI elements within the volume of the cylinder in the fifth modified GUI; and
outputting the fifth modified GUI for display on the AR/VR-capable display device.

15. The AR/VR-capable device of claim 10, the operation further comprising:
receiving, from a controller device, user input selecting a first GUI element of the first plurality of GUI elements of the first arrangement;
determining a second plurality of GUI elements associated with selecting the first GUI element;
determining that a second GUI element of second plurality of GUI elements comprises text;
arranging the second plurality of GUI elements according to a second arrangement, wherein the second arrangement positions at least the text proximate to a position on the surface of the cylinder farthest from a user;
generating a first modified GUI comprising a first portion of the cylinder and the second plurality of GUI elements arranged according to the second arrangement within the volume of the first portion of the cylinder, wherein the first portion of the cylinder is farther from the user relative to a second portion of the cylinder, wherein the second portion of the cylinder is not depicted in the first modified GUI; and
outputting the first modified GUI on the AR/VR-capable display device.

16. A non-transitory computer-readable storage medium having computer-readable program code embodied therewith, the computer-readable program code executable by a processor to perform an operation comprising:
determining a position of an augmented reality and/or virtual reality (AR/VR)-capable device relative to a position of a tracking point, wherein the tracking point comprises a physical beacon device;
determining a first arrangement of a first plurality of graphical user interface (GUI) elements associated with an application based on the position of the AR/VR-capable device relative to the tracking point; and
generating, by operation of a processor, a GUI comprising the first plurality of GUI elements arranged within a volume of a cylinder according to the first arrangement, wherein the cylinder is centered on the tracking point, and wherein, as the AR/VR-capable device moves around the physical beacon device, at least one of the first plurality of GUI elements is moved to remain on a surface of the cylinder farthest from the AR/VR-capable device.

17. The computer-readable storage medium of claim 16, wherein the tracking point comprises a beacon device, the operation further comprising:
outputting the GUI for display via an AR/VR-capable display device, wherein a radius of the cylinder is defined by the position of the beacon device and a surface of the cylinder, wherein at least one GUI element of the first plurality of GUI elements in the first arrangement is positioned on the surface of the cylinder.

18. The computer-readable storage medium of claim 17, wherein a user of the AR/VR-capable device is external to the cylinder and the GUI, the operation further comprising:
   monitoring a gaze of the user;
   determining that the gaze of the user is focused on a first GUI element of the first plurality of GUI elements of the first arrangement;
   arranging the first plurality of GUI elements according to a second arrangement, wherein the second arrangement positions the first GUI element proximate to a position of the surface of the cylinder nearest to the user;
   generating a first modified GUI comprising the first plurality of GUI elements arranged according to the second arrangement within the volume of the cylinder; and
   outputting the first modified GUI on the AR/VR-capable display device.

19. The computer-readable storage medium of claim 18, the operation further comprising:
   receiving, from a controller device, user input selecting the first GUI element;
   determining a second plurality of GUI elements associated with selecting the first GUI element;
   arranging the second plurality of GUI elements according to a third arrangement based on at least one of the gaze of the user and the position of the AR/VR-capable device relative to the beacon device;
   generating a third modified GUI, comprising:
      the second plurality of GUI elements arranged according to the third arrangement within the volume of the cylinder, and
      the first plurality of GUI elements according to the second arrangement within the volume of the cylinder, wherein a vertical position of the first plurality of GUI elements within the volume of the cylinder is located above a vertical position of the second plurality of GUI elements within the volume of the cylinder; and
   outputting the third modified GUI for display on the AR/VR-capable display device.

20. The computer-readable storage medium of claim 19, wherein the AR/VR-capable device comprises a mobile computing device, wherein the AR/VR-capable display device is included in the mobile computing device, wherein the AR/VR-capable display device comprises a mount assembly configured to removably attach with the mobile computing device, the operation further comprising:
   determining that the gaze of the user is focused upward on one of the first plurality of GUI elements;
   generating a fourth modified GUI comprising the first plurality of GUI elements according to the second arrangement proximate to a vertical position within the volume of the cylinder proximate to the vertical position of the second plurality of GUI elements within the volume of the cylinder in the third modified GUI, wherein generating the fourth modified GUI further comprises at least one of:
      (i) removing the second plurality of GUI elements from the fourth modified GUI; and
      (ii) positioning the second plurality of GUI elements according to the third arrangement proximate to a vertical position within the volume of the cylinder below the vertical position of the first plurality of GUI elements within the volume of the cylinder in the fourth modified GUI; and
   outputting the fourth modified GUI for display on the AR/VR-capable display device.

* * * * *